L. C. QUINBY.
Feather-Renovators.
No. 197,663. Patented Nov. 27, 1877.
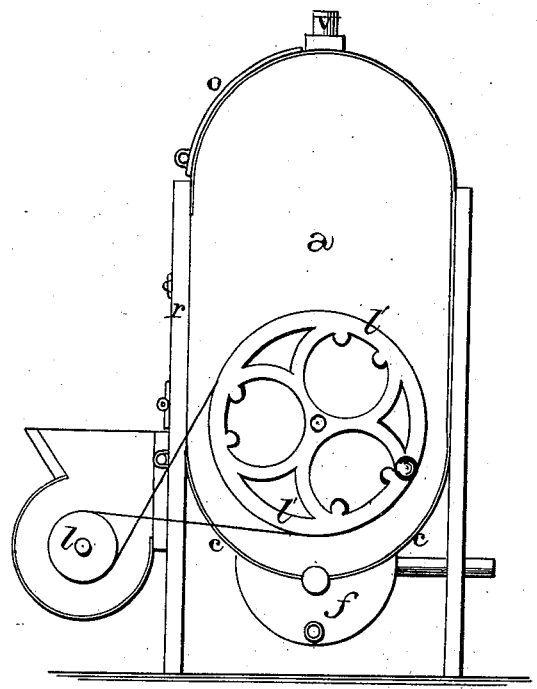
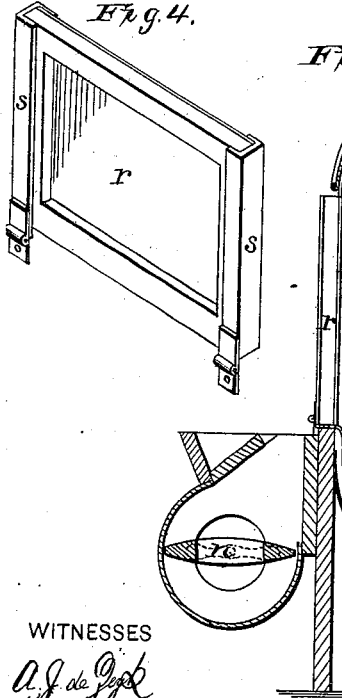
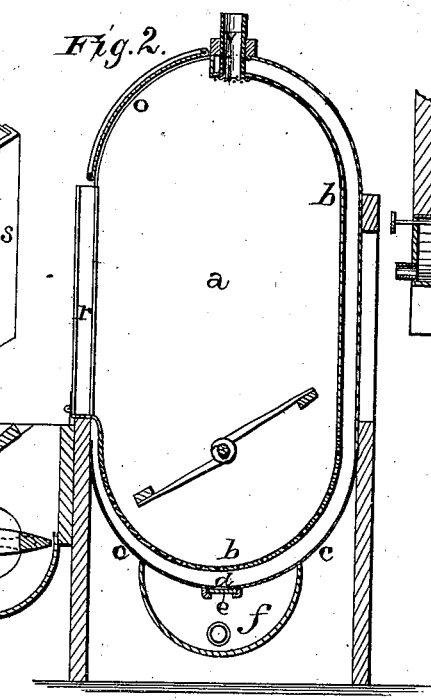
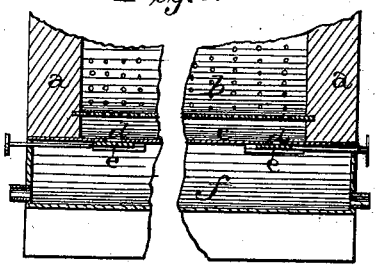
WITNESSES
INVENTOR
ATTORNEY

UNITED STATES PATENT OFFICE.

LEVI C. QUINBY, OF MONTICELLO, IOWA.

IMPROVEMENT IN FEATHER-RENOVATORS.

Specification forming part of Letters Patent No. 197,663, dated November 27, 1877; application filed June 18, 1877.

*To all whom it may concern:*

Be it known that I, LEVI C. QUINBY, of Monticello, in the county of Jones and State of Iowa, have invented certain new and useful Improvements in Feather-Renovators; and I do hereby declare the following to be a full, clear, and exact description of the invention, such as will enable others skilled in the art to which it pertains to make and use it, reference being had to the accompanying drawings, which form part of this specification.

My invention relates to an improvement in feather renovators and separators; and it consists in the arrangement and combination of parts, that will be more fully described hereinafter, whereby feathers are thoroughly and quickly cleansed of all dirt and impurities.

The accompanying drawings represent my invention.

Figure 1 is an end view of my renovator. Fig. 2 is a vertical section of the same, and Figs. 3 and 4 are detail views.

$a$ represents the two end pieces, which are made rounding at each end, and which have secured to them the sheet-metal covering $b$, so as to form a chamber, into which the feathers are placed while being renovated. The lower part of this chamber is perforated, as shown, and outside of this perforation is placed a jacket, $c$, so as to close the perforations from the outside. Through this jacket are made two holes, $d$, each one of which is provided with a movable slide, $e$, so as to control the passage of the steam into the chamber where the feathers are being cleaned.

Just below this jacket is secured the steam and water chamber $f$, into which the steam is introduced from the steam-generator, for the purpose of cleaning the feathers. At each end of this steam-chamber there is a stop-cock, for the purpose of allowing the water or condensed steam to be drawn off at will from the chamber.

Placed in the chamber where the feathers are is any suitable stirring device, so as to keep the feathers constantly moving, and thus bring every part in contact with the steam.

As the feathers are being cleaned all the steam and dirt from the feathers escapes up through the top of the chamber, and is conveyed away by means of a pipe, $v$, so as to allow no unpleasant smell to annoy the operator or persons in the same building.

The frame is provided with two doors—one at the top, $o$, that opens upward, and a second one lower down, $r$, which opens in the opposite direction. This lower door $r$ is placed in suitable hinge-guides $s$, so that it can be removed from the frame entirely when so desired.

Upon the end of the stirrer is placed a grooved end wheel, $l'$, from which passes a belt or cord around the small pulley $l$ on the end of the fan $n$.

After the feathers have been thoroughly cleaned and then dried by the heat of the steam and hot water in the steam or water chamber, the upper door $o$ is opened upward, and the lower door $r$ is removed from the frame entirely, and then the stirrer and the fan are both put in operation. As the stirrer raises the feathers upward, they are struck by a current of air from the fan and blown upward and out of the machine, leaving all dirt and impurities behind.

By means of this fan not only are the feathers removed from the frame without any manual labor, but all dust that may be in the feathers is blown away, and the feathers left perfectly clean.

I am aware that removable doors have been used upon stoves, and this I disclaim.

Having thus described my invention, I claim—

1. In combination with a feather-renovator, the hinged frames or guides $s$, sliding door fitting therein, and a fan, $n$, whereby, when the door is removed, the fan may be used to blow the feathers out of the frame, substantially as set forth.

2. In a feather-renovator, the combination of the end pieces $a$, covering $b$, jacket $c$, reservoir $f$, valves $e$, stirrer, door $r$, fan $n$, and a driving mechanism, whereby, after the feathers have been cleaned, they can be blown from the frame, leaving all impurities behind, substantially as set forth.

In testimony that I claim the foregoing I have hereunto set my hand this 8th day of June, 1877.

LEVI C. QUINBY.

Witnesses:
T. B. FULLERTON,
F. B. DAVIS.